United States Patent
Zhu et al.

(10) Patent No.: US 7,679,857 B2
(45) Date of Patent: Mar. 16, 2010

(54) NON-CONTACT MEASUREMENT OF SLIDER FLY HEIGHT BY ELECTROSTATIC FORCE

(75) Inventors: Li-Yan Zhu, San Jose, CA (US); Chao-Hui Yang, Milpitas, CA (US); Yen Fu, San Jose, CA (US); Ellis T. Cha, San Ramon, CA (US)

(73) Assignee: SAE Magnetics (HK) Ltd., Shatin, N.T. (HK)

( * ) Notice: Subject to any disclaimer, the term of this patent is extended or adjusted under 35 U.S.C. 154(b) by 0 days.

(21) Appl. No.: 12/199,761

(22) Filed: Aug. 27, 2008

(65) Prior Publication Data

US 2008/0316637 A1    Dec. 25, 2008

Related U.S. Application Data

(63) Continuation of application No. 11/605,741, filed on Nov. 28, 2006, now Pat. No. 7,440,219.

(51) Int. Cl.
G11B 5/60 (2006.01)
(52) U.S. Cl. .......................................... 360/75
(58) Field of Classification Search ................. None
See application file for complete search history.

(56) References Cited

U.S. PATENT DOCUMENTS

| | | | |
|---|---|---|---|
| 4,777,544 A | 10/1988 | Brown et al. |
| 4,931,887 A | 6/1990 | Hegde et al. |
| 5,130,866 A | 7/1992 | Klaassen et al. |
| 6,359,746 B1 | 3/2002 | Kakekado et al. |
| 6,529,342 B1 | 3/2003 | Feng et al. |
| 6,700,724 B2 | 3/2004 | Riddering et al. |
| 6,757,120 B2 | 6/2004 | Minoshima et al. |
| 6,765,745 B2 | 7/2004 | Smith et al. |
| 6,775,089 B1 | 8/2004 | Bonin et al. |
| 6,876,509 B2 | 4/2005 | Bonin et al. |
| 6,888,693 B2 | 5/2005 | Boutaghou et al. |
| 6,967,805 B1 | 11/2005 | Hanchi et al. |
| 6,967,806 B2 | 11/2005 | Rao et al. |
| 6,985,326 B2 | 1/2006 | Zhu et al. |
| 7,016,139 B2 | 3/2006 | Baumgart et al. |
| 7,042,670 B2 | 5/2006 | Feng et al. |
| 7,046,473 B2 | 5/2006 | Fu et al. |
| 7,068,449 B2 | 6/2006 | Riddering et al. |
| 7,068,457 B2 | 6/2006 | Riddering et al. |
| 7,119,979 B2 | 10/2006 | Fong et al. |
| 7,199,960 B1 | 4/2007 | Schreck et al. |
| 7,233,451 B2 | 6/2007 | Baumgart et al. |
| 7,277,252 B1 | 10/2007 | Albrecht et al. |
| 7,286,314 B2 | 10/2007 | Baumgart et al. |

(Continued)

*Primary Examiner*—Hoa T Nguyen
*Assistant Examiner*—James L Habermehl
(74) *Attorney, Agent, or Firm*—Saile Ackerman LLC; Stephen B. Ackerman (57) ABSTRACT

In a system and method for a non-contact measurement of the fly height of a slider above a magnetic data storage medium using electrostatic force, a slider with a read/write head flies over a magnetic data storage medium. A series of distinct voltages are applied between the slider and the magnetic data storage medium, and corresponding read-back signals are recorded. Using the recorded read-back signals, coefficients for an empirical curve-fit equation are calculated. The coefficients are normalized and converted into a fly height measurement.

6 Claims, 7 Drawing Sheets

U.S. PATENT DOCUMENTS

| | | |
|---|---|---|
| 7,310,197 B2 | 12/2007 | Baumgart et al. |
| 7,310,198 B2 | 12/2007 | Baumgart et al. |
| 7,321,476 B2 * | 1/2008 | Baumgart et al. ............. 360/25 |
| 7,457,070 B2 * | 11/2008 | Matsushita ................... 360/75 |
| 7,468,196 B2 * | 12/2008 | Feng et al. .................. 427/127 |
| 2005/0270684 A1 | 12/2005 | Baumgart et al. |
| 2007/0183078 A1 | 8/2007 | Matsushita |
| 2009/0074949 A1 * | 3/2009 | Feng et al. ..................... 427/8 |

* cited by examiner

NON-CONTACT MEASUREMENT OF SLIDER FLY HEIGHT BY ELECTROSTATIC FORCE

RELATED APPLICATIONS

This application is a continuation of patent application Ser. No. 11/605,741 filed on Nov. 28, 2006 now U.S. Pat. No. 7,440,219.

BACKGROUND INFORMATION

The present invention relates to magnetic hard disk drives. More specifically, the present invention relates to a method of measuring the fly height of magnetic heads over magnetic data storage media by electrostatic force.

Figure 1:
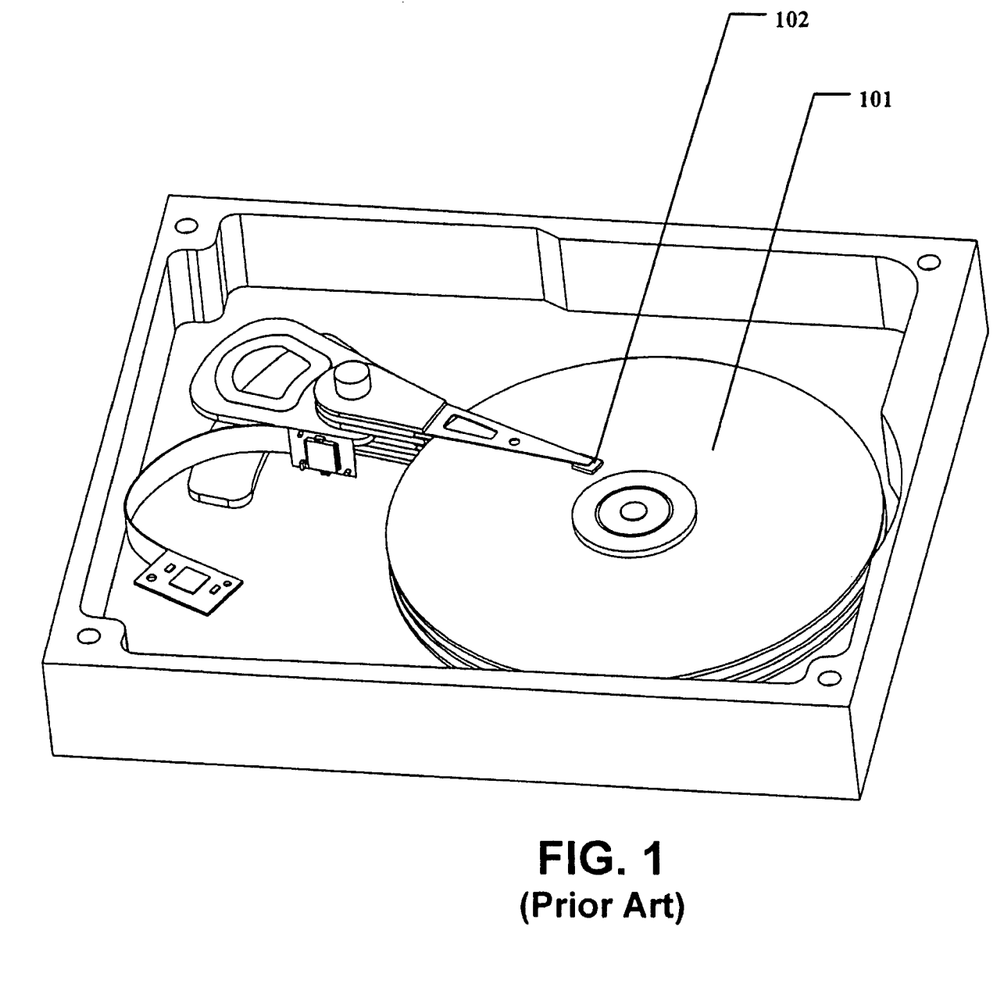
FIG. 1 illustrates a hard disk drive design typical in the art.

FIG. 1 illustrates a hard disk drive design typical in the art. Hard disk drives are common information storage devices essentially consisting of a series of rotatable disks 101, or other magnetic storage mediums, that are accessed by magnetic reading and writing elements. These data transferring elements, commonly known as transducers 102, are typically carried by and embedded in a slider body that is held in a close relative position over discrete data tracks formed on a disk 101 to permit a read or write operation to be carried out. In order to properly position the transducer 102 with respect to the disk surface, an air bearing surface (ABS) formed on the slider body experiences a fluid air flow that provides sufficient lift force to "fly" the slider and transducer above the disk data tracks. The high speed rotation of a magnetic disk generates a stream of air flow or wind along its surface in a direction substantially parallel to the tangential velocity of the disk. The air flow cooperates with the ABS of the slider body which enables the slider to fly above the spinning disk. In effect, the suspended slider is physically separated from the disk surface through this self-actuating air bearing.

Figure 2:
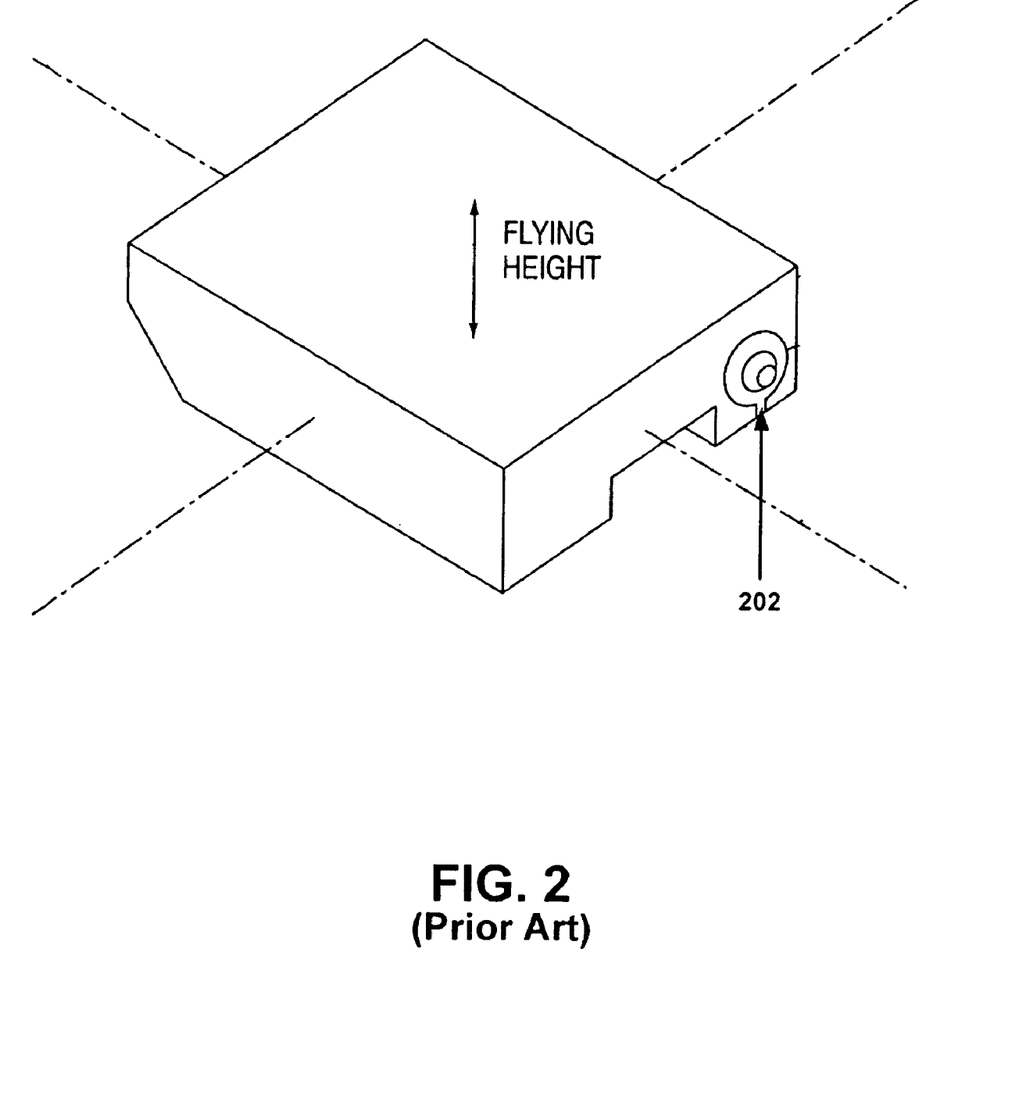
FIG. 2 illustrates a slider flying over a magnetic disk at a fly height.

FIG. 2 illustrates a slider flying at a fly height over a magnetic disk. Some of the major objectives in ABS designs are to fly the slider and its accompanying transducer 202 as close as possible to the surface of the rotating disk, and to uniformly maintain that constant close distance regardless of variable flying conditions. The height or separation gap between the air bearing slider and the spinning magnetic disk is commonly defined as the fly height. In general, the mounted transducer or read/write element flies only approximately less than one micro-inch (25.4 nm) above the surface of the rotating disk. The fly height of the slider is viewed as one of the most critical parameters affecting the magnetic disk reading and recording capabilities of a mounted read/write element. The fly height of the slider also directly impacts the mechanical integrity and magnetic performance of a disk drive. A relatively small fly height allows the transducer to achieve greater resolution between different data bit locations on the disk surface, thus improving data density and storage capacity. With the increasing popularity of lightweight and compact notebook type computers that utilize relatively small yet powerful disk drives, the need for a progressively lower fly height has continually grown.

Various methods exist for measuring the fly height of a slider. One such method is optical fly height measurement. Optical fly height measurement is based on the interference of light reflected off the slider ABS and disk surface. It requires a transparent disk, and poses a great danger of electrostatic discharge (ESD) damage to the delicate read-write transducers. As a result, optical fly height measurement is typically only performed on a small fraction of sliders, as part of statistical process control.

Fly height measurement by read-back signal is another method of measuring the fly height of a slider. Fly height measurement by read-back signal is based on the Wallace equation of spacing loss. By comparing the amplitudes of read-back signals under two distinct conditions, the spacing variations can be calculated. However, the slider fly height must be known under at least one of the two distinct conditions in order to know the actual fly height. Thus, fly height measurement by read-back signal usually requires a "touch-down" process, in which the fly height of the slider is brought down to, or near, zero. Measurement of the slider fly height upon touch-down provides a reference fly height for measuring the slider fly height at the other distinct condition, and permits the actual fly height to be measured. The touch-down process, however, causes wear in the slider-disk interface and is time-consuming. Moreover, the magnetic spacing between the read-write transducer and the disk at touch-down is uncertain due to the inclusion of debris and lubricant as well as due to slider vibration. The result does not correlate well to actual slider reliability.

Recently, fly height adjustment by thermal expansion has been adopted by the industry. An electrical heater embedded in the slider, in the proximity of the read-write transducer, causes the transducer to protrude out of the originally flat ABS, toward the disk. The nominal fly height may be raised somewhat before activation, then reduced as necessary by the heater to perform read-write activities. With this technology, slider fly height tolerance can be relaxed somewhat. However, fly height control remains critical in the drive production, to minimize the number of low-flyers (sliders that fly too low and which cannot be salvaged by the heater) and high-flyers (sliders that fly too high and which require excessive heat, thus wasting electricity and shortening the read sensor lifespan). The "touch-down" is accelerated and simplified with the heater, compared to sliders without the heater. Nevertheless, the fly height at touch-down remains uncertain. Further, wear and tear on the slider and the disk may prevent the touch-down process from being performed repeatedly. Accordingly, it is difficult to optimize the magnitude of heater protrusion in-situ in portable devices, in which the fly-height changes frequently with ambient pressure and temperature.

Fly height may also be adjusted by electrostatic force. A voltage is applied between the slider body and the disk. Compared with the thermal expansion method, the electrostatic force method requires less power. Also, adjusting the fly height by electrostatic force does not heat up the read-write sensor. However, there is a risk of arcing if the voltage is excessive. Regardless of the method of fly height adjustment, the fly height itself can be measured either by read-back signal or by the capacitance between the slider and the disk. In either case, an undesirable "touch-down" is necessary.

Thus, what is needed is an improved method of measuring the slider fly height, without a transparent disk, and without "touch-down."

DETAILED DESCRIPTION

A system and method for the non-contact measurement of the fly height of a slider using electrostatic force is disclosed. A slider with a read/write head may interface with a predetermined track on a magnetic data storage medium. While the read/write head of the slider is interfacing with the predetermined track, a series of distinct voltages may be applied between the slider and the magnetic data storage medium. In response to the applied distinct voltages, read-back signals may be recorded based on each applied voltage. The read-back signals may be used to calculate the coefficients of a quadratic equation. The coefficients may then be normalized using the vertex of the quadratic equation. The normalized coefficients may then be converted into a slider fly height measurement.

Figure 3:
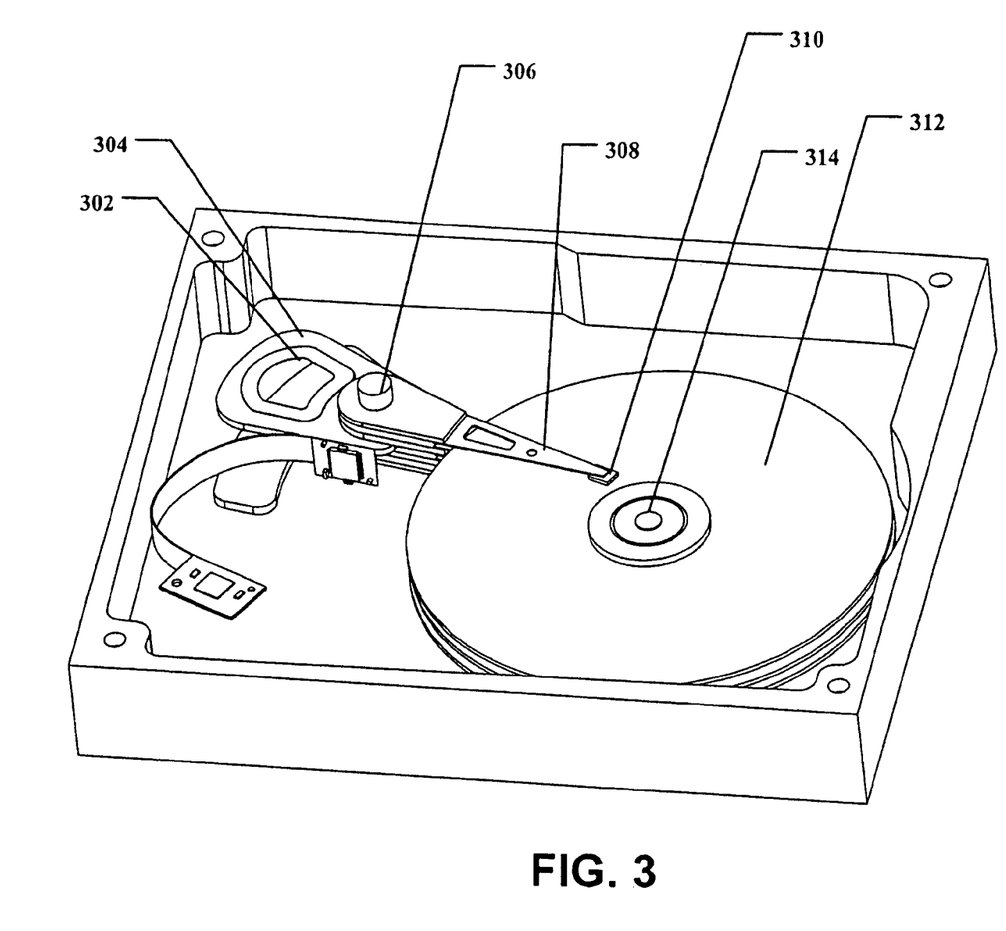
FIG. 3 illustrates one embodiment of a disk drive system as practiced in the present invention.

FIG. 3 illustrates one embodiment of a disk drive system as practiced in the present invention. The disk drive system may include a voice coil motor 302 used to rotate an actuator arm 304 on a spindle 306 around an axis. A suspension including a load beam 308 may be connected to the actuator arm 304. The suspension may carry a slider 310. The slider 310 may contain a read/write head or read/write transducer (not shown) for reading and/or writing data on a magnetic disk. As the disk rotates, the slider 310 may fly above the disk 312 at a certain fly height. As the slider 310 flies above the disk 312, the interface between the slider and the disk may be characterized or modeled as a non-parallel capacitor. The slider may act as an upper electrode while the magnetic disk may act as a lower electrode. The disk drive system may also include a power source component (not shown) such as a regulated DC power supply or one or more DC batteries, for supplying a control voltage to the spacing between the slider and the magnetic disk surface.

In one embodiment, the slider 310 and the disk 312 may be electrically isolated from each other, so that the voltage between them may be manipulated. Some leakage resistance, such as 10 MΩ, between the slider and the disk may be acceptable and expected, so long as the leakage does not create too much current such that the slider, disk, or motor may be damaged. In one embodiment, the slider body may be grounded. Generally, the slider body may be grounded to the suspension body through the use of silver epoxy. Alternatively, the slider body may be grounded through a gold pad bonded to a grounded trace. Because the slider body is grounded, the disk may not be grounded. In one embodiment, the disk 312 may be isolated from the disk spindle 314. Alternatively, the disk spindle 314 may be electrically isolated from the motor base (not shown). In either embodiment, an electrical path may be established from the disk 312 to the power source component. In another embodiment, the disk may be grounded. The slider 310 may be electrically isolated from the load beam 308 through a non-conductive adhesive. The slider 310 may also be electrically connected to the power source component.

Generally, the fly height of a slider decreases as voltage is applied between the slider and the disk, due to an attractive force described by the equation $$F \approx kV^2/h^2,$$

where F represents the electrostatic attractive force between the two electrodes (i.e., the transducer in the slider and the disk). The symbol k represents a constant value. The symbol V represents voltage applied to the electrodes, or the potential difference in the electrostatic field between the slider and the disk. The symbol h represents the distance between the transducer head and the disk.

Figure 4:
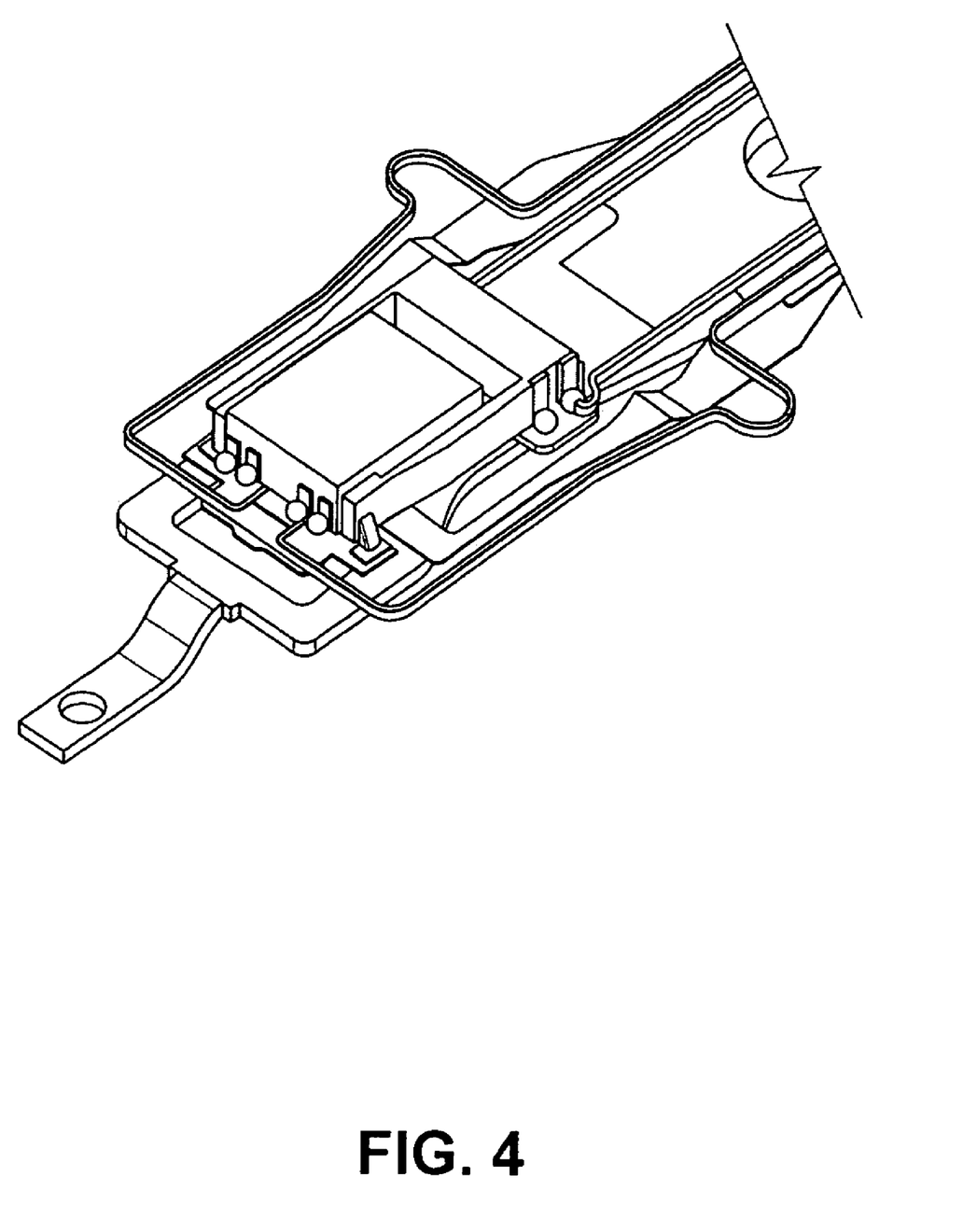
FIG. 4 illustrates a head-gimbal assembly with a micro-actuator.

FIG. 4 illustrates a head-gimbal assembly with a micro-actuator. The micro-actuator may include slider with a read/write head, or read/write transducer, including a set of read elements to read data from a data storage medium and a set of write elements to write data to the data storage medium. The slider may be coupled or electrically connected to a power source. The power source may provide a variable control voltage to the spacing between the slider and the data storage medium. The power source may be a regulated DC power supply. Alternatively, the power source may be one or more DC batteries. A current-limiting device, such as a resistor, may prevent the power source from applying excessive voltage and damaging the slider or the data storage medium. In one embodiment, the current-limiting device may be built into or be a component of the power source.

Figure 5:
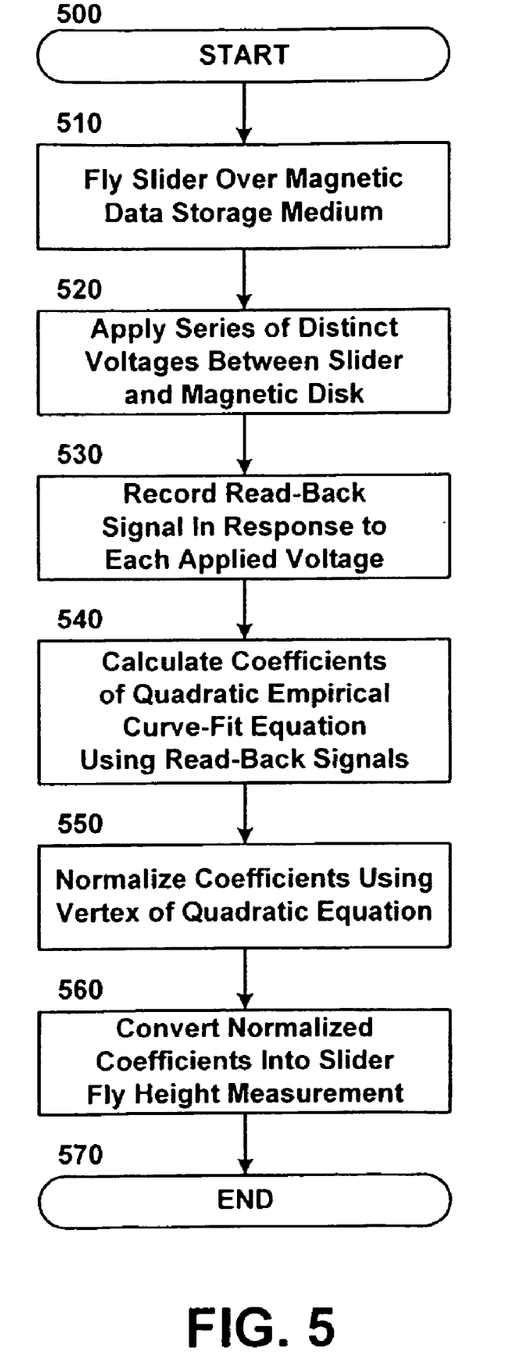
FIG. 5 illustrates in a flowchart one embodiment for the non-contact measurement of a fly height of a slider using electrostatic force.

FIG. 5 illustrates in a flowchart one embodiment for the non-contact measurement of the fly height of a slider using electrostatic force. In block 510, a slider with a read/write head may be flown over a magnetic data storage medium. The slider ABS and the disk surface of the magnetic data storage medium may naturally develop different potentials due to dissimilarity of materials. Accordingly, a spontaneous voltage may exist across the slider air-bearing, when the slider body and disk substrate are electrically shorted together. In block 520, a series of distinct control voltages may be applied between the slider and the disk to create an electrostatic force. In one embodiment, the series of distinct voltages may be applied successively when the slider read/write head conducts read or write operations over a discrete data track of the magnetic data storage medium. In one embodiment, the series may include three distinct voltages which may be applied successively while a read/write transducer is reading a discrete data track of the magnetic data storage medium. One of these three distinct voltages may be zero.

The source of the distinct control voltage may be one or more DC batteries. Alternatively, the power source may be a regulated DC power supply. The power supply or batteries may be a component of the disk drive system. In one embodiment, the power supply or batteries may be coupled to the slider. As part of the measurement process, a range of control voltage levels may be applied between the slider and the disk, such that adequate fly height change is yielded and no slider-disk touch-down contact results. The control voltages supplied by the power source may include voltages of both polarities. A voltage of one polarity having an extreme value may result in a slider fly height decrease substantially equal to the fly height decrease caused by another extreme voltage value of the other polarity. Generally, however, the range of applied voltages is selected such that the applied voltages coupled with the spontaneous voltage results in a 50% decrease in fly height is achieved on typical sliders. The accuracy of fly-height measurement may be impaired if the range of applied voltages is too narrow. However, the applied voltages should never be so high that arcing becomes a serious problem. To minimize the probability of arcing, the range of applied voltages should be such that fly-height reduction by both positive and negative voltages is equal. The range of applied voltages may not be symmetrically distributed around zero due to intrinsic surface potential differences between the slider and disk. The offset from zero generally may be between 0.5 and 1 Volt. To minimize the damage caused by arcing, a current-limiting device, such as a resistor, may be included in the disk drive system. In one embodiment, the current-limiting resistor may be incorporated or built into the power source of the distinct control voltage. Alternatively, the current-limiting resistor may be placed in close proximity to the air-bearing surface. For example, the resistor may be embedded in the slider, so that the capacitance of the conductive path does not contribute directly to the arcing energy.

In block 530, the track-averaged amplitude of the read-back signal also may be measured and recorded. When slider transducers conduct read or write operations over a discrete data track found on the magnetic data storage medium, the read-back signal amplitude may be measured in response to the application of a distinct control voltage between the slider and the disk. Moreover, so long as the read-circuit pre-amplifier operates in a linear range, the gain of the read-circuit pre-amplifier may not necessarily be required. During the fly height measurement, the written track being measured may be wider than the read width of the slider transducer. The slider may also read the data on-track to minimize amplitude fluctuation associated with radial displacement, which is also known as track mis-registration (TMR). The wavelength of the written signal also may be constant, in order that no effort may be required to adjust the calibration constant. In addition, in one embodiment, the fly height measurement may be performed as part of a magnetic parametric test, so that no additional handling is needed.

In block 540, the coefficients of a quadratic empirical curve-fit equation may be calculated. In one embodiment, in measuring the fly height of a slider using a non-contact method such as electrostatic force, the air bearing between the slider and the disk may be modeled as a non-parallel plate capacitor. Electrostatic force between the slider and the disk may be approximated more accurately as $$F \approx (V-V_0)^2 h^{-q},$$

where F is the electrostatic force, V is the distinct control voltage applied between the slider and the disk, $V_0$ is an initial potential difference in the electrostatic field between the slider and the magnetic disk surface and is determined by the material property of the slider and disk surfaces, q is determined by ABS rail shapes and slider flying pitch angle (usually 1<q<2), and h is the fly height of the slider. For each slider air bearing design, a numerical simulation may be conducted under successively increasing electrostatic voltages to obtain a function of slider fly height versus voltage. This function may be curve-fitted to yield the variable q. Currently, the "CML Air Bearing Simulation Package" developed by the Computer Mechanics Laboratory of UC-Berkeley is used to conduct the numerical simulation.

In one embodiment, the slider air bearing may be treated as a non-linear spring and may be modeled as $\partial A/\partial h \propto h^\gamma$, where $\gamma$ is approximately unity. Using the Wallace equation of spacing loss, $\partial A/\partial h \propto A_0$, where $A_0$ may be the read-back amplitude at a nominal fly height. Alternative, $A_0$ may be the read-back amplitude at a specific reference fly height. Using the chain-rule of differential calculus, $$\partial A/\partial V = \partial A/\partial h * \partial h/\partial F * \partial F/\partial V \propto A_0 * h^{\gamma-q} * (V-V_0).$$

Integrating the equation yields $$A = c A_0 * h^{\gamma-q} * (V-V_0)^2 + b.$$

In comparison, the quadratic equation used for an empirical curve-fit may be expressed as $$A = a*(V-V_0)^2 + b.$$

Substituting the quadratic equation for the variable A in the integrated equation and simplifying the equation yields $$h = (a/c A_0)^{1/(\gamma-q)},$$

where c may represent the wavelength of the written signal, the pre-amp gain, and the transducer sensor efficiency. As long as c remains constant, that is, the variables comprising c do not change during the fly height measurement test, the fly height may be approximated as $$h \propto (a/A_0)^{1/(\gamma-q)},$$

where the exponent $1/(\gamma-q)<0$. Thus, the slider fly height h may be a monotonically decreasing function of $a/A_0$. In block 550, the calculated coefficients may be normalized using the apex height or vertex of the resulting parabola of the quadratic empirical curve-fit equation. In block 560, the normalized quadratic coefficients may be converted into a fly height measurement for the slider.

The above-disclosed embodiment of a method of fly-height measurement can be implemented on completely assembled disk drives, partially assembled disk drives, or testers for characterizing components of a disk drive (such as a head-gimbal assembly, or a head-arm assembly). Because this method is non-destructive, it may be applied frequently in operating disk drives. Consequently, slider fly height may be monitored as often as needed and the amount of fly-height reduction may be known before each read/write operation. The fly-height reduction may be achieved by electrostatic force alone, by heater alone, or by a combination of electrostatic force and heater protrusion. Reducing slider fly height by electrostatic force rather than heater protrusion may result in a faster response time and lower power consumption. However, excessive electrostatic force may pose an arcing hazard and may encourage debris collection on the slider. Optimizing the use of electrostatic force and heater protrusion in combination to reduce slider fly height however may result in acceptably low delay, power consumption, debris collection, and arcing.

Figure 6:
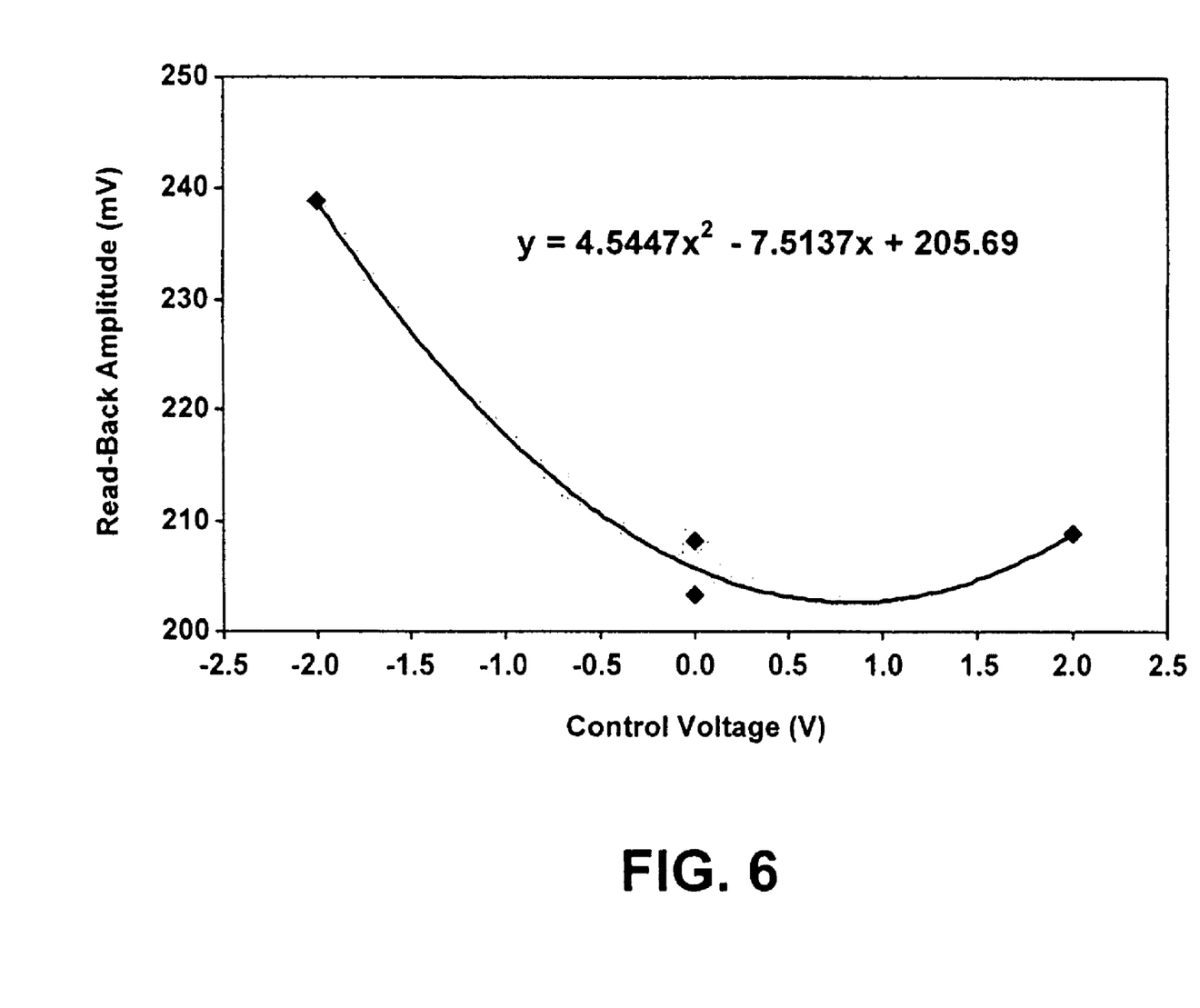
FIG. 6 illustrates one embodiment of a graph of the curve-fit of empirical data taken from a slider.

FIG. 6 illustrates one embodiment of a graph of the curve-fit of empirical data taken from a slider. In this embodiment, sample data taken from a measurement of the slider fly height results in the quadratic coefficient a=4.5447. The reference read-back amplitude $A_0$ may be calculated from the quadratic equation to be 205.69. Thus, $a/A_0=0.022$.

Figure 7:
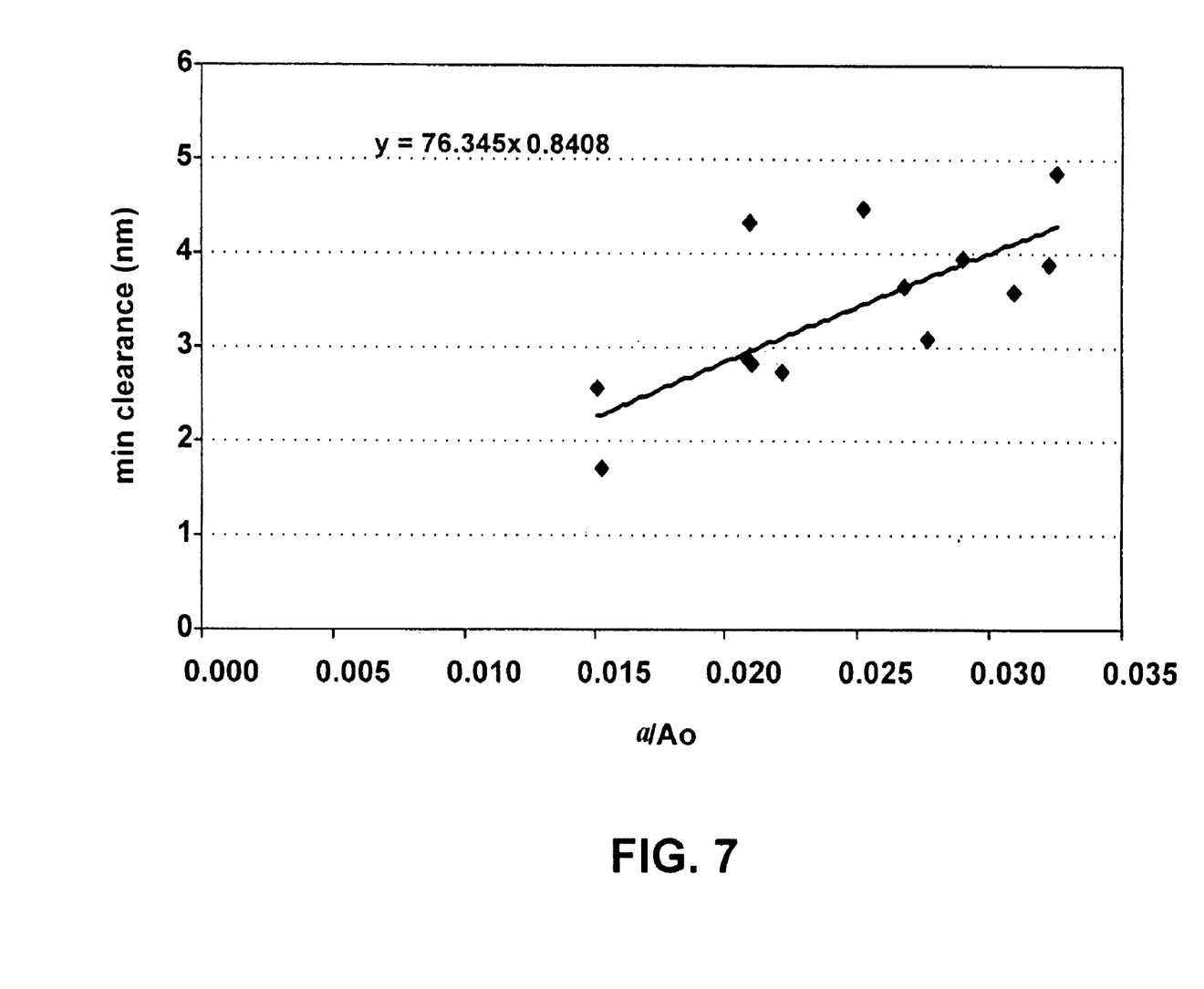
FIG. 7 illustrates one embodiment of a graph showing the correlation between slider fly clearance and the value $a/A_0$.

FIG. 7 illustrates one embodiment of a graph showing the correlation between slider clearance and the value $a/A_0$, where the fly height is measured by the Wallace equation for spacing loss using the traditional "touch-down" method after the control voltages have been applied between the slider and the disk. Because the "touch-down" method may not accurately yield the true fly height due to slider vibration and debris, the graph has been labeled "clearance" instead of "fly height."

Using the disclosed novel method to measure the fly height of a slider may enable the manufacturer to increase the sample size, thus improving the level of confidence in statistical process control. The method may even enable the manufacturer to screen each slider and position the slider by its fly height.

Therefore, the foregoing is illustrative only of the principles of the invention. Further, those skilled in the art will recognize that numerous modifications and changes are possible, the disclosure of the just-described embodiments does not limit the invention to the exact construction and operation shown, and accordingly, all suitable modifications and equivalents fall within the scope of the invention.

What is claimed is:

1. A disk drive for implementing a slider fly height measurement, comprising:
- a slider with a read/write head having a set of read elements to read data and a set of write elements to write data;
- a suspension to support the slider and maintain a spacing between the slider and the magnetic data storage medium;
- a magnetic data storage medium to store data, wherein said data can include constant wavelength signals for minimizing read-back amplitude fluctuation at a fixed spacing during the fly height measurement;
- a power source to provide a variable control voltage to the spacing between the slider and the magnetic data storage medium thereby changing said spacing and producing a corresponding measurable variation in a track read-back signal amplitude;
- a means of measuring an averaged value of said track read-back signal amplitude corresponding to said variable control voltage;
- a quadratic curve-fitting algorithm implemented in the drive to extract a set of coefficients from said track-averaged read-back signal amplitudes and to obtain a value of the fly height thereby.

2. The disk drive of claim 1, further comprising a current-limiting resistor to prevent damage to the disk drive.

3. The disk drive of claim 1, wherein the power source is a regulated DC power supply.

4. The disk drive of claim 1, wherein the power source is at least one DC battery.

5. The disk drive of claim 2, wherein the current-limiting resistance is a component of the power source.

6. The disk drive of claim 1, wherein the power source is coupled to said slider.

* * * * *